(12) United States Patent
Lottes et al.

(10) Patent No.: US 12,565,247 B2
(45) Date of Patent: Mar. 3, 2026

(54) SPAN BOLSTER

(71) Applicant: KASGRO RAIL CORPORATION,
New Castle, PA (US)

(72) Inventors: Morgan Lottes, Lawrence, KS (US);
Edward Burris, Bazine, KS (US)

(73) Assignee: KASGRO RAIL CORPORATION,
New Castle, PA (US)

( * ) Notice: Subject to any disclaimer, the term of this
patent is extended or adjusted under 35
U.S.C. 154(b) by 197 days.

(21) Appl. No.: 17/382,265

(22) Filed: Jul. 21, 2021

(65) Prior Publication Data

US 2022/0024499 A1 Jan. 27, 2022

Related U.S. Application Data

(60) Provisional application No. 63/054,490, filed on Jul.
21, 2020.

(51) Int. Cl.
B23K 37/00 (2025.01)
B61F 3/10 (2006.01)
B61F 5/50 (2006.01)
B61D 3/16 (2006.01)

(52) U.S. Cl.
CPC ............... B61F 5/50 (2013.01); B23K 37/00
(2013.01); B61F 3/10 (2013.01); B61D 3/166
(2013.01)

(58) Field of Classification Search
CPC .............. B23K 7/10; B23K 7/005; B61F 5/04
See application file for complete search history.

(56) References Cited

U.S. PATENT DOCUMENTS

| | | | | |
|---|---|---|---|---|
| 4,164,906 A * | 8/1979 | Nieviarovski | ........... | B61D 3/16 410/44 |
| 4,263,852 A * | 4/1981 | Kramlinger | ............ | B61D 3/166 105/182.1 |
| 4,264,058 A * | 4/1981 | Wear | ...................... | B23K 7/005 266/70 |
| 4,311,098 A * | 1/1982 | Irwin | ......................... | B61F 5/04 105/226 |
| 4,330,076 A * | 5/1982 | Lollis | ..................... | B61D 17/00 266/70 |
| 4,356,774 A * | 11/1982 | Wear | ......................... | B61F 5/16 105/226 |
| 4,901,649 A * | 2/1990 | Fehrenbach | ............. | B61D 3/16 105/228 |
| 5,802,981 A * | 9/1998 | Kassab | .................. | B61D 3/166 105/157.1 |
| 6,662,853 B2 * | 12/2003 | Bauer | ..................... | B22C 9/088 164/369 |

(Continued)

*Primary Examiner* — Erin B Saad
(74) *Attorney, Agent, or Firm* — Michael G. Monyok

(57) ABSTRACT

A method for manufacturing a multiple axle railcar utilizing
a non-stressed span bolster is disclosed. The span bolster
supports the load of the railcar using camber to efficiently
distribute the load from the railcar among the truck assem-
blies and axles. The manufacturing method discloses the
fabrication and layout of a span bolster where non-stressed
camber is incorporated into the structural elements of the
span bolster. The camber is produced geometrically by
parallelogram shaped plates supporting the weight of the
railcar. The amount of camber may be modified for different
load ratings. The railcar and span bolster are constructed of
alloy steel to minimize railcar tare weight and maximize
load capacity.

6 Claims, 7 Drawing Sheets

(56)            References Cited

U.S. PATENT DOCUMENTS

| 10,252,733 B1 * | 4/2019 | Tavares | .................... | C21D 1/20 |
| 2003/0217669 A1 * | 11/2003 | Kassab | .................... | B61D 3/16 |
| | | | | 105/238.1 |
| 2014/0116285 A1 * | 5/2014 | Goding | .................... | B61F 5/08 |
| | | | | 105/34.1 |
| 2014/0116287 A1 * | 5/2014 | Goding | .................... | B61F 5/04 |
| | | | | 105/96 |
| 2014/0169903 A1 * | 6/2014 | Nooren | .................... | B61D 3/16 |
| | | | | 410/45 |
| 2016/0362119 A1 * | 12/2016 | Odden | .................... | B61F 3/125 |
| 2022/0024499 A1 * | 1/2022 | Lottes | ..................... | B61F 5/50 |

* cited by examiner

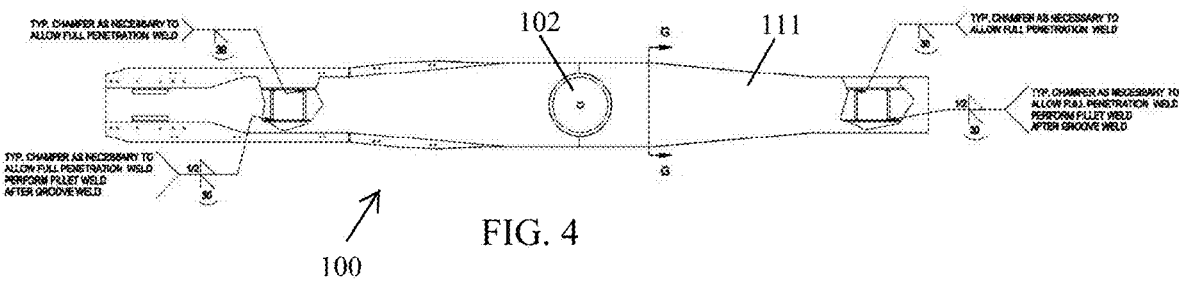

TYP. CHAMFER AS NECESSARY TO
ALLOW FULL PENETRATION WELD

TYP. CHAMFER AS NECESSARY TO
ALLOW FULL PENETRATION WELD

TYP. CHAMFER AS NECESSARY TO
ALLOW FULL PENETRATION WELD
PERFORM FILLET WELD
AFTER GROOVE WELD

TYP. CHAMFER AS NECESSARY TO
ALLOW FULL PENETRATION WELD
PERFORM FILLET WELD
AFTER GROOVE WELD 102    111    100

FIG. 4

TYP. CHAMFER AS NECESSARY TO
ALLOW FULL PENETRATION WELD
PERFORM FILLET WELD
AFTER GROOVE WELD 102    110

FIG. 5A

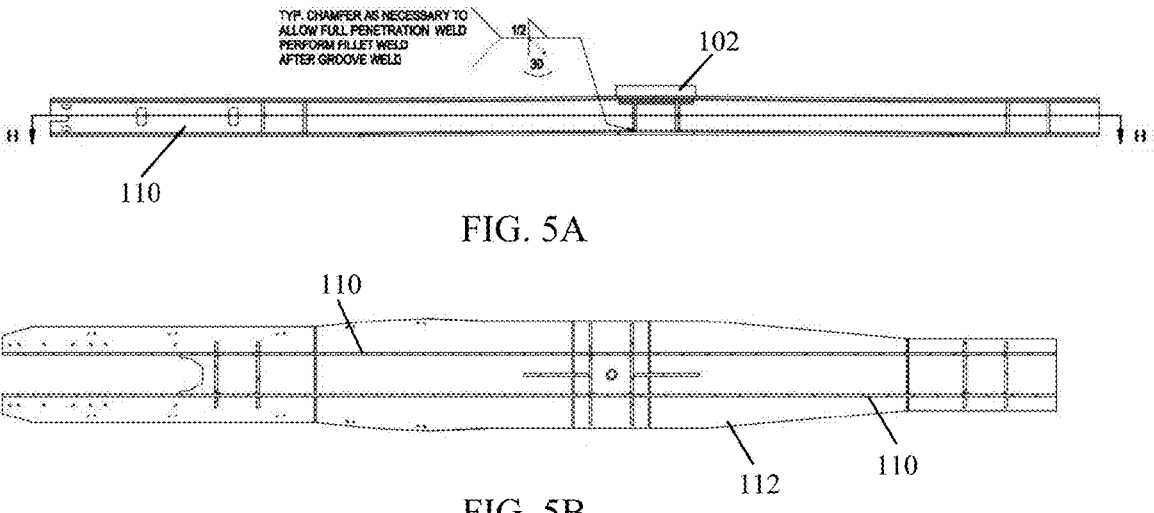

VIEW "Q-Q"

112

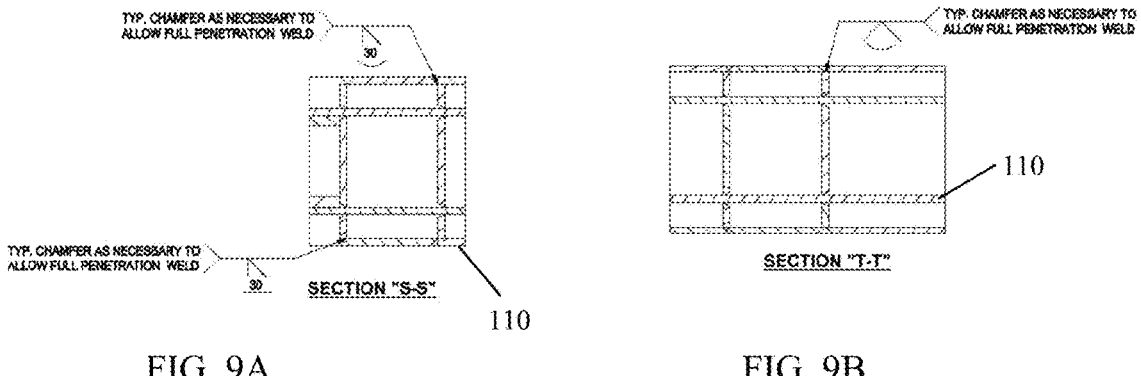
FIG. 9A                                    FIG. 9B
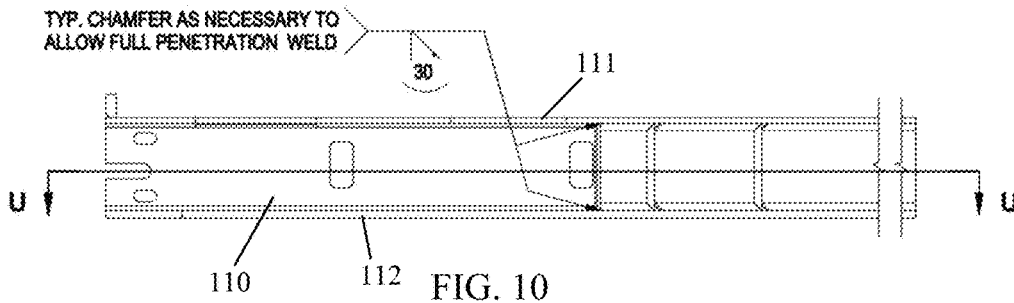
FIG. 10
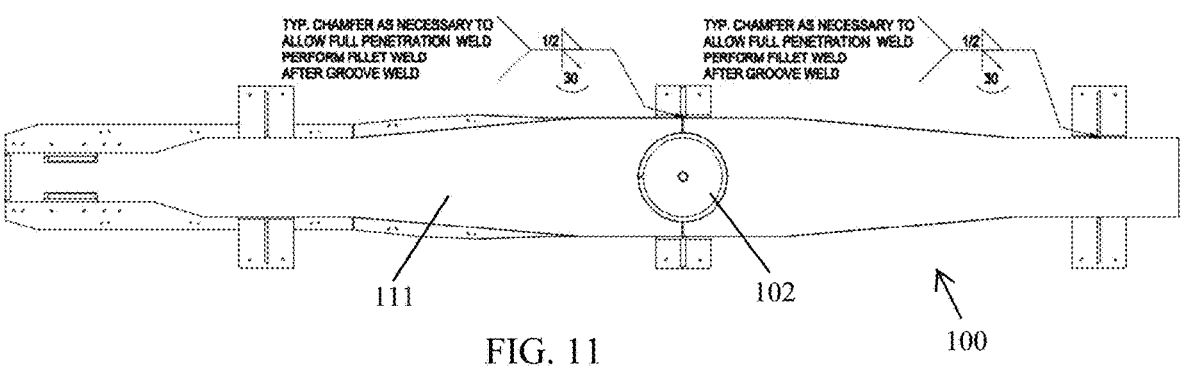
FIG. 11

SPAN BOLSTER

CROSS-REFERENCE TO RELATED APPLICATIONS

This application claims the benefit under 35 U.S.C. § 119 of Provisional Application Ser. No. 63/054,490, filed Jul. 21, 2020, which is incorporated herein by reference.

STATEMENT REGARDING FEDERALLY SPONSORED RESEARCH

Not applicable.

BACKGROUND OF THE INVENTION

The invention relates generally to a span bolster for a railcar. More specifically, the invention relates to a span bolster used to distribute a load on a multiple-axle railcar designed for carrying heavy loads.

Heavy capacity and specialty type railcars, generally defined as freight cars with greater than a 110-ton capacity, have been used in North America for decades. This type of railcar can include depressed deck and flush deck variations, with or without span bolsters, in eight, twelve, sixteen, twenty, twenty-two, twenty-four, and thirty-six axle configurations. Heavy capacity railcars can be used to transport loads that exceed the axle load limits of standard 4-axle railcars. For example, large power transformers are critical infrastructure and typically weight between 300,000 and 600,000 lbs. However, most railroads in North America limit the load at each axle to 71,000 lbs. or less, meaning a 4-axle railcar could not be used.

In order to support the heavier load, additional axles are provided on heavy capacity railcars to spread the weight of the load across the rails, as weight supported per axle is the limiting factor in rail car capacity. The span bolster essentially acts as an adapter between the rail car body and the added truck assemblies to uniformly distribute the load of the car and freight to the rails. As the number of axles on a railcar increase, additional span bolsters are required, increasing the tare weight of the railcar. For comparison, general service and commodity type freight rail cars, 110-ton capacity and under, utilize two truck assemblies without span bolsters to support the car and freight load.

Heavy capacity and many specialty flat cars operate on a restricted interchange basis, which requires the prior authorization of the handling railroad for operation along railroad lines where track weight restrictions and bridge and tunnel clearances limit unrestricted access. Accordingly, railcar tare weights for heavy load shipments are a significant factor in obtaining railroad clearance to operate. A railcar with lighter tare weight can often provide railroad clearance approval for heavy freight shippers to operate on marginal or otherwise weight restricted rail lines. Lighter tare weight cars also provide shippers with cost savings through lower transportation costs which are based upon the total gross rail load (i.e. railcar and freight). Therefore, it would be advantageous to develop a lightweight span bolster capable of supporting and distributing heavy loads.

BRIEF SUMMARY

According to one embodiment of the present invention is a span bolster comprising a multipart structural section and a method of manufacturing the span bolster. The span bolster connects truck assemblies to the railcar body, where a pivot point centered on the span bolster is used to connect to the railcar body. The span bolster behaves like a beam supporting a load on a foundation (i.e. axles). Like any beam, there will be some load induced deflection in the beam, where the center of the span bolster bends relative to the ends of the span bolster. Due to the need for the weight to be balanced across the truck assemblies, the middle of the span bolster is raised vertically in an unloaded state, so that when it is fully loaded, the span bolster will be relatively level. This vertical offset is known as camber. The amount of camber necessary can be modified to achieve different load ratings. The method of manufacturing creates a precise camber to achieve the desired load rating, while allowing for weight reduction compared to other heavy cargo railcars.

BRIEF DESCRIPTION OF THE SEVERAL VIEWS OF THE DRAWINGS

FIG. 4 is a top view of the span bolster with cutouts to show the internal structure of the span bolster.

FIGS. 5A-5B are side and top views of the span bolster showing the internal structure.

FIGS. 9A-9B are detailed views of the span bolster near the attachment points.

FIG. 10 is a side view of the span bolster.

FIG. 11 is a top view of the span bolster showing the truck assembly attachment points.

DETAILED DESCRIPTION

Figure 1A:
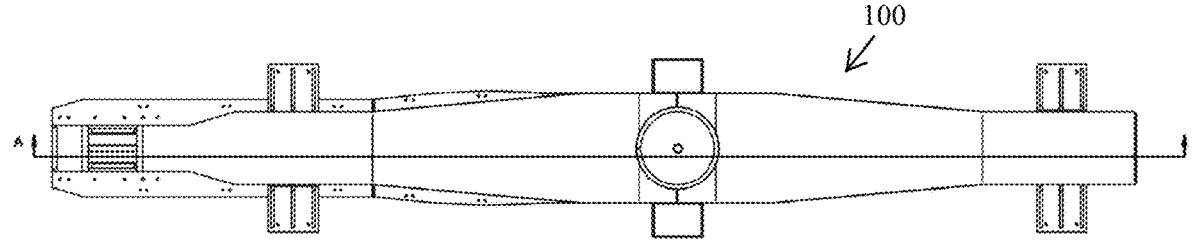
FIGS. 1A-1D are top, side, and detailed views of a multi-part span bolster having a camber.
Figure 1B:
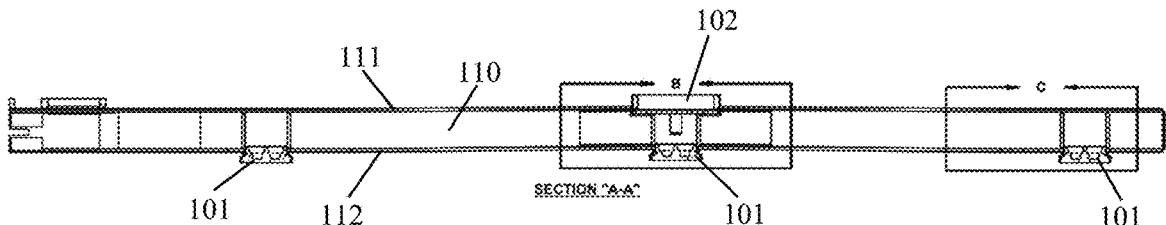

In the example embodiment shown in FIGS. 1A-1B is a span bolster 100 having a built-in camber. The span bolster 100 shown in FIGS. 1A-1B is designed to carry three truck assemblies 120 for a total of six axles 121, as each assembly 120 carries a pair of axles 121. Two span bolsters 100 can be used at each end of the railcar to create a twelve-axle railcar. The span bolster 100 comprises vertical plates 110, a top plate 111, and a bottom plate 112 arranged in a configuration designed to carry the expected load of the railcar and to provide attachment points 101 for the truck assemblies 120. The vertical plates 110 run substantially the length of the span bolster 100 and can be fabricated in independent sections.

Figure 1C:
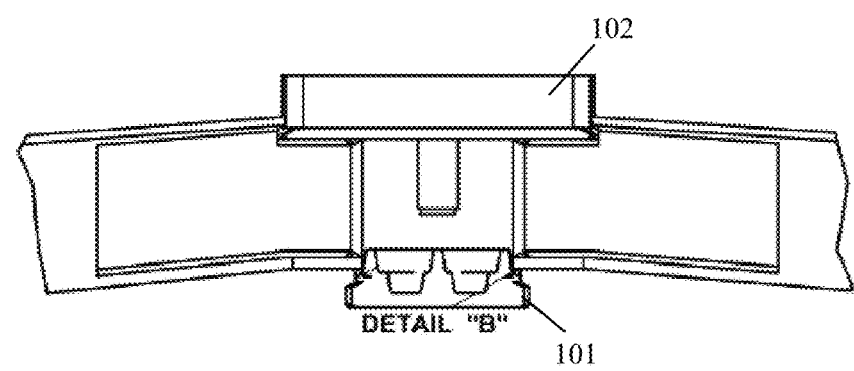
Figure 1D:
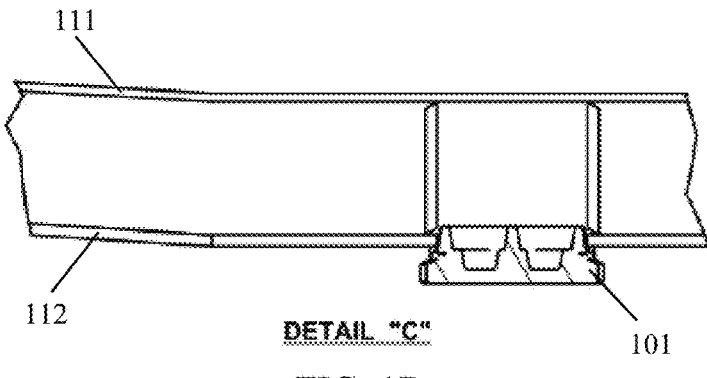

As shown in FIG. 1B, the camber has a peak near the center of the span bolster 100 and tapers towards the ends, near the attachment points 101 for each of the outboard trucks 120. FIG. 1C shows a detailed view of the attachment point 101 for the center truck assembly 120 at the peak of the camber. The peak shown in FIG. 1C also coincides with a pivot point 102, which is the point where the body of the railcar attaches to the span bolster 100. As is known in the art, the pivot point 102 allows the span bolster 100 to rotate independently of the railcar body, aiding turning performance. FIG. 1D shows a detailed view of the span bolster 100 at an outboard truck assembly attachment point 101.

The camber can be created by fabricating the vertical plates 111 with a parallelogram shape. The size of the camber will depend, in part, on the expected load to be carried by the railcar.

The method of manufacturing can be used to fabricate a multiple-axle railcar utilizing non-stressed span bolsters 100. Each span bolster 100 carries the load of the railcar body plus lading, distributing the load to the truck assemblies 120 so that the weight is efficiently distributed from the railcar body through the pivot point 102. All or several components of the span bolster 100 and railcar may be constructed from light weight high strength alloy steel and joined together with full penetration welds. In one example embodiment, the steel alloy is ATSM 514 grade alloy steel to minimize tare weight. To determine the camber required for an estimated load carrying capacity, finite element analysis or other computational analyses can be used to determine the size of the non-stressed camber formed in the span bolster 100.

Manufacturing the span bolster 100 involves assembling multiple components to create the camber without pre-stressing the span bolster 100. The manufacturing method reduces stress in the steel and the amount of steel required compared to other fabrication techniques. Unlike designs that use structural plates under a tensile load to maintain strength, the top plate 111 and bottom plate 112 of the span bolster 100 disclosed herein are stressed in shear. Accordingly, this load path management, when combined with the high strength material, produces a span bolster 100 with balanced stress distribution and even deflection under load.

In some embodiments, the method of manufacture may use multiple flat plates of steel for the top 111 and bottom plates 112 arranged to follow the camber of the vertical plates 110 without bending. To adjust the camber, the angle of the vertical plates 110 can be modified. Accordingly, adjusting the camber as described produces a span bolster that maintains equal weight balance for different freight capacities. The fabrication technique reduces resting stress in the steel plate 111, 112 allowing for less material to be used while maintaining high tensile strength. Moreover, the ability to accurately modify the camber by adjusting the angle at which the vertical plates 110 are prefabricated results in a span bolster 100 that maintains equal weight balance for different load capacities. By providing a significant reduction in heavy capacity railcar tare weights, the span bolster 100 permits access to rail lines, bridges, and tunnels which may otherwise be limited or weight restricted.

Figure 2A:
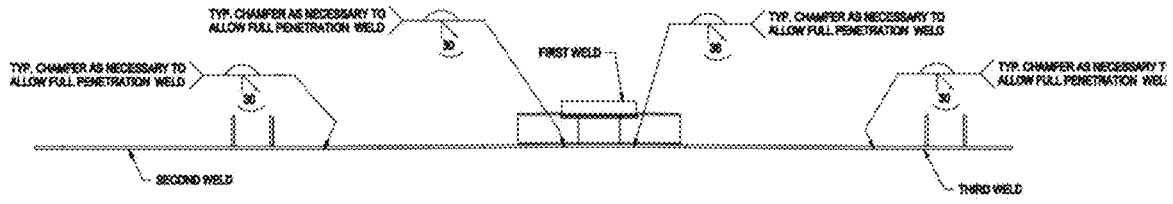
FIGS. 2A-2C are show components of the span bolster.
Figures 2B, 2C:
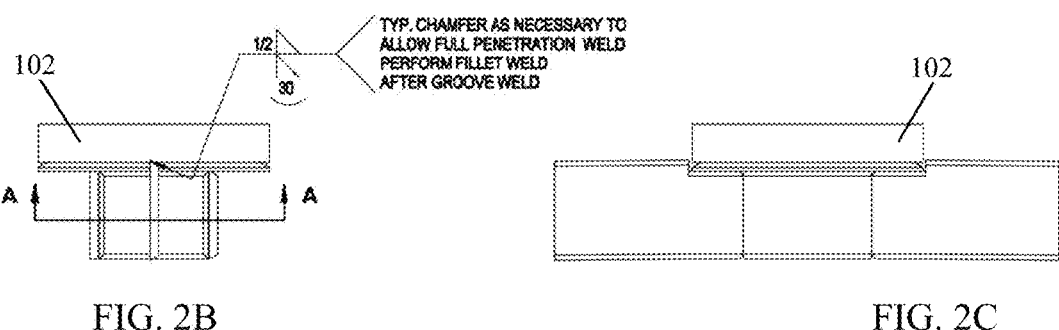
Figure 3:
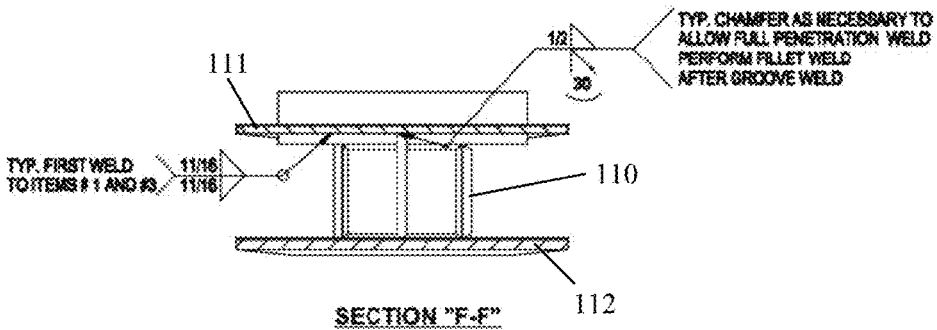
FIG. 3 is a detailed view of the pivot point of the span bolster.
Figure 6A:
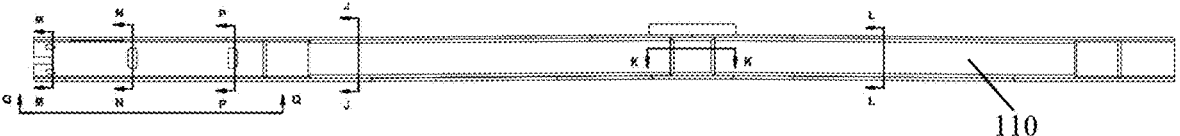
FIGS. 6A-6B are side and top views of portions of the span bolster.
Figure 6B:
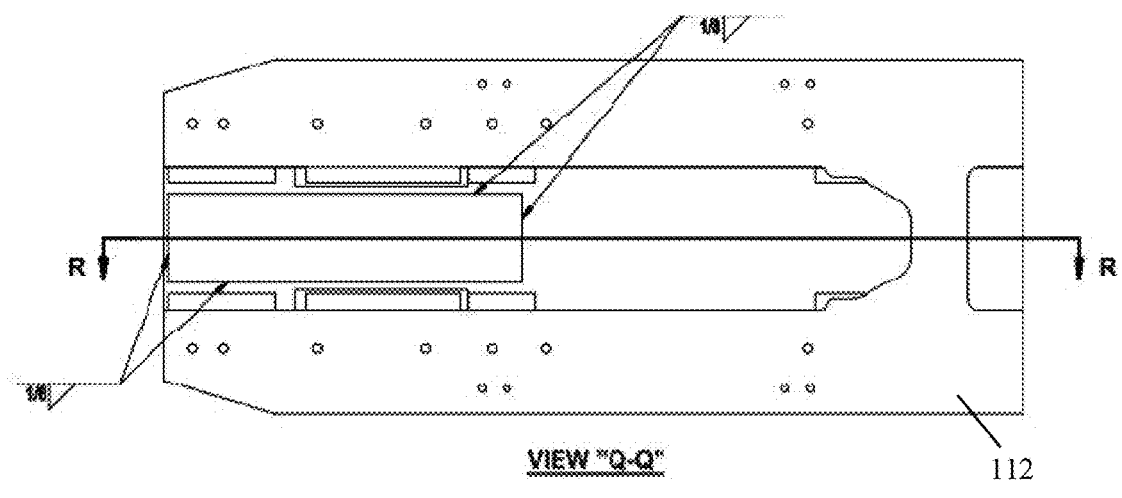
Figure 7:
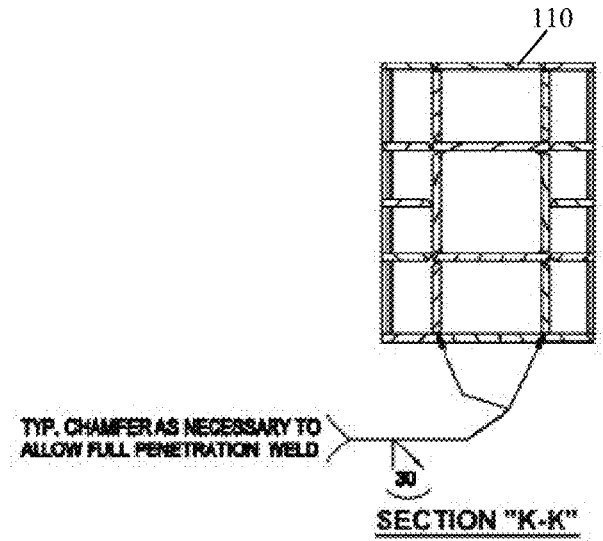
FIG. 7 is a detailed view of the structure near the pivot point.
Figure 8:
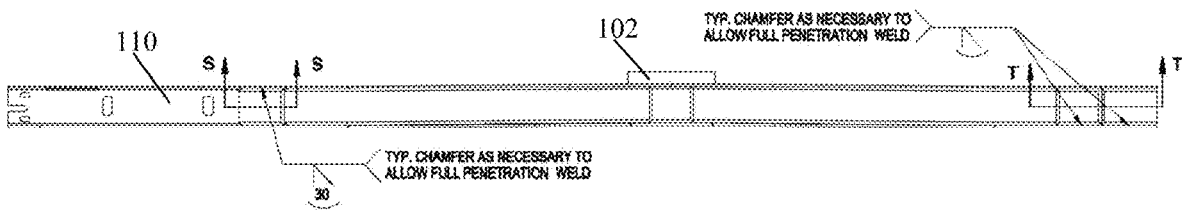
FIG. 8 is a side view of the span bolster.
Figure 12:
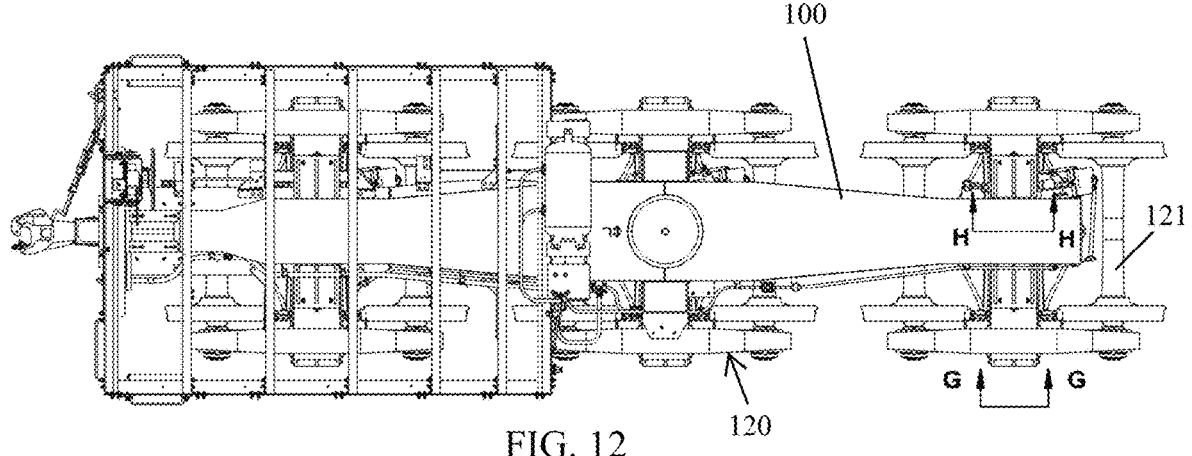
FIG. 12 depicts a span bolster with truck assemblies mounted.

Referring again to the drawings, FIGS. 2A-11 show the order of assembly for a twelve-axle span bolster 100, according to one example embodiment. The order of assembly permits full penetration welds between the vertical plates 100 and the top plates 111 and bottom plates 112. As shown in FIG. 2A, the first three welds occur at the junction between the attachment point 101 for the truck assembly 120 and the bottom plate 112. The first weld also occurs at the pivot point 102 for the span bolster 100, as shown in FIG. 2B. In order to achieve the correct camber without bending or prestressing the steel, the top plate 111 and bottom plate 112 can be fabricated in sections and joined by welds. As such, FIG. 2 also shows welds occurring between sections of the bottom plate. Multiple sections of bottom plate 112 can also be seen in FIG. 5B. FIG. 3 shows the fourth weld, which involves the center attachment point 101 and pivot point 102. Next, as shown in FIG. 4, additional welds are made between the vertical plates 110 near the attachment points 101. FIGS. 5A-5B shows additional welds near the pivot point 102 and center attachment point 101. As shown in the view depicted in FIG. 5B, the vertical plates 110 form a box structure around the pivot point 102 and attachment points 101. FIGS. 6A-6B shows the location of the next welds involving the vertical plates 110, towards the end of the bolster 100. FIG. 7 depicts the box structure formed around the pivot point 102 using the vertical plates 110. Similarly, FIG. 8 and FIGS. 9A-9B show the box structures formed around the outboard attachment points 101. FIG. 10 shows welds at between the vertical plates 110 and the top plate 111 and bottom plate 112. Next, at FIG. 11, the attachment points for the truck assemblies are constructed and welded to the span bolster 100. FIG. 12 shows a completed span bolster 100 with truck assemblies 120 and axles 121 mounted.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

What is claimed is:

1. A method of manufacturing a span bolster for a railcar comprising:
   forming a structure comprising a plurality of vertical plates running substantially a length of the span bolster, wherein the structure has a camber with a vertical peak near a pivot point adapted to engage a railcar body, wherein each vertical plate of the plurality of vertical plates comprises more than one independent section connected at the pivot point;
   welding a bottom plate to the structure;
   welding a top plate to the structure; and
   forming a plurality of attachment points for truck assemblies, wherein the attachment points are affixed on the structure adjacent the bottom plate, wherein a first outboard attachment point is positioned near a first end of the structure, a second outboard attachment point is positioned near a second end of the structure, and a central attachment point is positioned between the first outboard attachment point and the second outboard attachment point beneath the pivot point, wherein the top plate at the vertical peak is positioned above the plurality of attachment points, wherein the top plate at the vertical peak is positioned above the top plate at the first end, and wherein the top plate at the vertical peak is positioned above the top plate at the second end.

2. The method of claim 1, wherein forming a structure comprises joining the plurality of vertical plates.

3. The method of claim 1, wherein welding comprises forming full penetration welds.

4. The method of claim 1, wherein the bottom plate comprises a plurality of plates.

5. The method of claim 1, wherein the top plate comprises a plurality of plates.

6. The method of claim 1, wherein each independent section has a parallelogram shape.

\* \* \* \* \*